United States Patent Office 2,885,415
Patented May 5, 1959

2,885,415

ORGANOTIN COMPOUNDS AND PROCESS OF PREPARATION

Hugh E. Ramsden, Metuchen, N.J., assignor to Metal & Thermit Corporation, New York, N.Y., a corporation of New Jersey No Drawing. Application January 22, 1953
Serial No. 332,759

12 Claims. (Cl. 260—429.7)

This invention relates to organotin derivatives of mercaptoalcohols, having particular utility as stabilizing agents for resins and the like, and to processes for manufacturing the same.

In accordance with this invention, the new group of compounds may be generally designated as condensation products of organotin compounds with a mercaptoalcohol in which each mercaptyl hydrogen has been replaced by a bond to an organotin group, the hydroxyl hydrogens either remaining intact or being replaced by bonds to the same or other organotin groups. These new compounds may be described by the emperical formula $$R_nSn(SR'O)_{\frac{4-n+m}{2}}H_m$$

wherein $n$ is 1, 2 or 3; R is a radical selected from the group consisting of alkyl, alkenyl, alkynyl, aryl and aralkyl groups; R' is selected from the group consisting of aliphatic and aromatic diradicals, and $m$ is a number from 0 to $4-n$. R' may be derived from any mercaptoalcohol wherein the mercapto group is not inactivated by molecular configuration, such as beta mercaptoethanol; 3-mercaptopropanol-1; 2-mercaptopropanol-1; 1-mercaptopropanol-2; 2 (or 3 or 4) mercapto-n-butanol-1; o-(or m-, or p-) mercaptobenzyl alcohol; etc.

It has been found that while organotin compounds can replace either mercaptyl or hydroxyl hydrogens of mercaptoalcohols, the Sn—S bond is stronger than the Sn—O bond and is preferentially formed. The partial compound formed in any given reaction depends therefore on the relative quantities of mercaptoalcohol and organotin compound taken. If the number of available valences on organotin residues is just equal to the number of mercaptyl hydrogens, the hydroxyl hydrogens will not be replaced and $m$ in the above formula will be equal to $4-n$. On the other hand, if the number of available valences on the organotin residue is twice the number of mercaptyl hydrogens, all of the hydroxyl hydrogens will be replaced and $m$ will be equal to zero. Compounds intermediate between these two types, in which some but not all of the hydroxyl hydrogens have been replaced, are also possible. Thus we may have among others, the following structures.

$R_3SnSR'OH$ here $n=3$, $4-n=1$, $m=1$, hence $$\frac{4-n+m}{2}=1$$

$R_3SnSR'OSnR_3$; here $n=3$, $4-n=1$, $m=0$, hence $$\frac{4-n+m}{2}=\frac{1}{2}$$

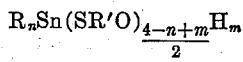

here $n=2$, $4-n=2$, $m=2$, hence $$\frac{4-n+m}{2}=2$$

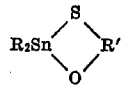

here $n=2$, $4-n=2$, $m=0$, hence $$\frac{4-n+m}{2}=1$$

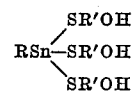

here $n=1$, $4-n=3$, $m=3$, hence $$\frac{4-n+m}{2}=3$$

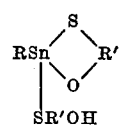

here $n=1$, $4-n=3$, $m=1$, hence $$\frac{4-n+m}{2}=2$$

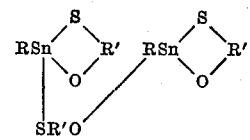

$n=1$, $4-n=3$, $m=0$, hence $$\frac{4-n+m}{2}=1\frac{1}{2}$$

The organotin derivatives of the mercaptoalcohols are excellent stabilizers for resins, particularly vinyl chloride-containing resins, in quantities as low as one quarter of one percent by weight of the resin. This stabilizing property is equally applicable to rigid plastic formulations and to plasticized compositions.

The organotin derivatives of the present invention may be prepared in any suitable manner. It has been found, however, that these products may be conveniently prepared by reacting an organotin compound containing a negative group attached to the tin with a mercaptoalcohol, and recovering a reaction product having the desired Sn—S linkage and ratio. More specifically, an organotin oxide or hydroxide may be condensed with a mercaptoalcohol to produce products characterized by the above formulae.

The reaction for the formation of the various organotin derivatives of mercaptoalcohols using organotin oxide and mercaptoethanol as the suitable reactants may be illustrated by the following equations:

(a)
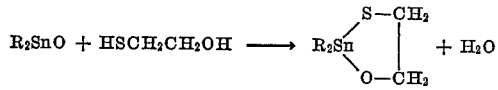

(b)

These equations illustrate that reaction occurs between the mercapto radical and the organotin oxide whereby water splits off and a chemical bond is formed between the tin and the sulfur. This occurs in both equations. In Equation *a*, further reaction is shown between the hydroxyl radical and the organotin oxide with, again, the elimination of water.

Organotin compounds other than the oxides may also be used such as the hydroxides ($R_3SnOH$), stannonic acids ($RSnOOH$), and the halides (e.g. chlorides, bromides, iodides). Reactions employing organotin hydroxides and stannoic acids follow essentially the same pattern as those for oxides. When the negative group attached to the organotin residue is a halide (i.e. a chloride, bromide or iodide) a basic material must be included in the reaction batch in order to neutralize the mineral acids produced during the reaction. Suitable basic or neutralizing agents are sodium hydroxide, sodium carbonate, sodium bicarbonate, tertiary amines, pyridine, etc.

Typical reactions of the organotin halides with a mercaptoalcohol are illustrated by the following equations:

(c) $R_3SnCl + NaOH + HSCH_2CH_2OH$
$\rightarrow NaCl + H_2O + R_3SnSCH_2CH_2OH$ (d) $R_2SnCl_2 + Na_2CO_3 + 2HSCH_2CH_2OH_2$
$\rightarrow 2NaCl + H_2O + CO_2 - R_2Sn(SCH_2CH_2OH)_2$ (e) $RSnCl_3 + 3pyridine + 3HSCH_2CH_2OH$
$\rightarrow 3pyridine \cdot HCl + RSn(SCH_2CH_2OH)_3$ In the above equations the quantity of organotin compound chosen is such that it is equivalent to the mercaptyl hydrogens. If more organotin compound is used there will also be replacement of the hydroxyl hydrogens of the mercaptoalcohols to produce the various types of structure described above.

Any suitable reaction temperatures may be employed. It is ordinarily preferred to use temperatures slightly in excess of 100° C. in order to remove the water of reaction as it is produced in the indicated reactions. Such reactions can be carried out at lower temperatures, however, and the water removed from the reaction product subsequently by further heating or other suitable means.

Another embodiment of this invention is the use of inert organic solvents such as toluene, benzene, etc., as the medium for the reaction. The presence of such solvent facilitates the desired reaction; it also provides a convenient means for collecting and measuring the water produced in the reaction and thus for determining when the reaction is finished. The solvent may be eliminated from the reaction product at the completion of the reaction by any suitable means, for example, by vaporizing the solvent under vacuum at elevated temperatures.

The aforesaid organotin derivatives are useful as stabilizers for chlorinated compositions such as chlorine-containing plastics. Their use as rubber accelerators, rubber antioxidants, polymerization accelerators, and petroleum additives are also suggested herein.

The following examples are further illustrative of these organotin derivatives of mercaptoalcohols, and their preparation, and it will be understood that the invention is not limited thereto:

EXAMPLE 1

Dibutyltin oxide (0.5 mole), beta mercaptoethanol (1 mole), and 500 ml. of toluene were heated and stirred at reflux until water of reaction ceased to distill. The solution was then filtered; the toluene removed by vacuum distillation. The residue, $(C_4H_9)_2Sn(SC_2H_4OH)_2$, a light yellow viscous liquid crystallized on cooling. Yield was 188 grams—analysis: percent Sn, 30.9; percent S, 15.1.

EXAMPLE 2

One mole of dibutyltin oxide, one mole of beta mercaptoethanol, and 500 ml. of toluene were heated and stirred at reflux until 1 mole of water was removed. The solution was filtered and vacuum stripped of solvent to yield 314 grams of a crystalline solid of 38% Sn, 10.3% S, and having the structural formula:

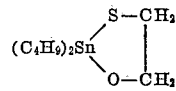

It has also been discovered and is a feature of this invention that the organotin derivatives of the mercapto-alcohols of this invention function as excellent stabilizers for resin compositions, particularly resin compositions containing vinyl chloride and plasticizers, and when intimately dispersed therein, will provide plastic compositions of improved resistance to heat deterioration. Stable thermoplastic compositions containing copolymers and vinylidene dichloride polymers are also obtainable with the use of the present organotin derivatives. Excellent films are obtained from the aforesaid plastic compositions which exhibit a high degree of stability. The optimum concentration of the aforesaid organotin derivatives, useful as a stabilizer is about 2% based on the weight of the vinyl resin. The resin composition containing this concentration of stabilizer produces a stable plastic film which does not darken at elevated temperatures as evidenced by the results of the heat tests in Table I.

The vinyl resins employed were polyvinyl chloride resins. The stabilizer was incorporated into a mixture of 100 parts by weight of resin and 50 parts by weight of di-2-ethylhexyl phthalate plasticizer.

This mixture was milled for 5 minutes on a two-roll differential speed mill at 320–325° F., being removed as a sheet. Portions of the sheet were placed in a single cavity mold (6" x 6" x 40 mils) preheated to 275° F. The mold was placed on a press and raised to 320° F., the pressure was raised to 40,000 pounds and held until the temperature reached 330° F. This process required 5 to 5.5 minutes. The pressed molded sheet was removed, cooled and cut into strips, 1" x 6". These strips were hung vertically and heat aged in a circulating air oven at 320° F. for 1 hour, 2 hours, 3 hours and 4 hours. Samples were rated visually, the degree of stability of the vinyl chloride resin film being represented by the depth of colorations.

*Table I*

| Stabilizer | Parts | Color | | | |
|---|---|---|---|---|---|
| | | 1 Hour | 2 Hours | 3 Hours | 4 Hours |
| None | | red-brown | black | | |
| Ex. 1 | | colorless | v. sl. yellow | v. sl. yellow | sl. yellow |
| Ex. 2 | | colorless | v. sl. yellow | v. sl. yellow | sl. yellow |

This table clearly discloses the unusual stabilizing activity of these organotin derivatives of alcohols in comparison to a resin without such stabilizer.

While the invention has been described with reference to various examples and embodiments, it will be apparent to those skilled in the art that various modifications may be made and equivalents substituted therefor, without departing from the principles and true nature of the present invention.

What is claimed by Letters Patent is:

1. Organotin derivatives of mercaptoalcohols having a formula selected from the group consisting of $R_3Sn(SR'OH)$, $R_3Sn—S—R'O—SnR_3$ and

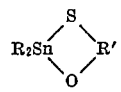

wherein R is a monovalent hydrocarbon radical and R' is a divalent hydrocarbon radical.

2. Organotin derivatives of formula

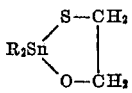

wherein R is an alkyl radical.

3.

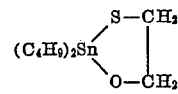

4. A method of preparing a compound of claim 1 which comprises reacting a hydrocarbontin halide selected from the group consisting of monohalides and dihalides with a mercapto alcohol of formula

HS—R—OH wherein R is a divalent hydrocarbon radical, in the presence of a basic neutralizing agent and recovering the desired compound.

5. A method of preparing a cyclic organotin derivative of a mercaptoalcohol which comprises reacting about equimolar amounts of a hydrocarbontin oxide and a mercaptoalcohol of formula HSROH, wherein R is a divalent hydrocarbon radical, and recovering said cyclic organotin compound.

6. A process according to claim 5 wherein dibutyltin oxide is reacted with beta mercaptoethanol.

7. Organotin derivatives of formula

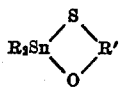

wherein R is a lower alkyl radical and R' is a lower divalent alkylene radical.

8. Organotin derivatives of formula

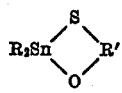

wherein R is an alkyl radical and R' is a divalent alkylene radical.

9. Organotin derivatives of formula

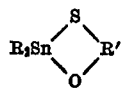

wherein R is alkyl and R' is a divalent lower alkylene radical.

10. A process for the preparation of organotin derivatives of formula

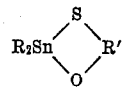

which comprises reacting an alkyltin oxide of formula $R_2SnO$ with a mercapto alcohol of formula HSR'OH and recovering said organotin derivative, wherein R is an alkyl radical and R' is a divalent alkylene radical, and wherein the reactants are employed in substantially equimolar amounts.

11. A process according to claim 10 wherein R is a lower alkyl radical and R' is a lower divalent alkylene radical.

12. A process according to claim 10 wherein R is an alkyl radical and R' is a lower divalent alkylene radical.

References Cited in the file of this patent

UNITED STATES PATENTS

| | | |
|---|---|---|
| 2,310,449 | Lightbrown et al. | Feb. 8, 1943 |
| 2,440,729 | Signaizo | May 4, 1948 |
| 2,604,460 | Mack | July 22, 1952 |
| 2,623,892 | Cleverdon et al. | Dec. 30, 1952 |
| 2,631,990 | Mack et al. | Mar. 17, 1953 |
| 2,636,891 | Gregory | Apr. 28, 1953 |
| 2,641,588 | Leistner et al. | June 9, 1953 |
| 2,713,585 | Best | July 19, 1955 |
| 2,789,994 | Ramsden et al. | Apr. 23, 1957 |

OTHER REFERENCES

"Report on Organo-Tin-Compounds," Div. B—National Defense Research Committee—of the Office of Scientific Research and Development—January 28, 1946, page 12.